United States Patent [19]

Berkenblit et al.

[11] 4,106,975
[45] Aug. 15, 1978

[54] PROCESS FOR ETCHING HOLES

[75] Inventors: Melvin Berkenblit, Yorktown Heights; See Ark Chan, Croton-on-Hudson; Arnold Reisman, Yorktown Heights; Stanley Zirinsky, Bronx, all of N.Y.

[73] Assignee: International Business Machines Corporation, Armonk, N.Y.

[21] Appl. No.: 811,750

[22] Filed: Jun. 30, 1977

[51] Int. Cl.² .................. C23F 1/00; G01D 15/18
[52] U.S. Cl. .......................... 156/628; 156/644; 156/647; 156/661; 156/667; 204/192 R; 252/79.2; 346/140 R; 427/383 R; 427/383 B; 427/404
[58] Field of Search ............ 156/639, 644, 647, 656, 156/661, 667, DIG. 904, 665, 628, 657; 427/383 R, 383 B, 399, 404, 89; 346/75, 140 R; 204/192 R; 252/79.2

[56] References Cited

U.S. PATENT DOCUMENTS

| | | | |
|---|---|---|---|
| 3,042,566 | 7/1962 | Hardy | 156/667 |
| 3,823,408 | 7/1974 | Gordon | 346/75 |
| 4,007,464 | 2/1977 | Bassous et al. | 346/75 |
| 4,008,111 | 2/1977 | Rutz | 156/667 |

OTHER PUBLICATIONS

Reisman et al., "The Chemical Polishing of Sapphire and MgAl Spinel" Journal of Electrochemical Society vol. 118, No. 10 (Oct. 1971) pp. 1653-1657.

Primary Examiner—Jerome W. Massie
Attorney, Agent, or Firm—Pollock, Vande Sande & Priddy

[57] ABSTRACT

A method for etching at least one aperture having a defined crystallographic geometry in single crystals which includes masking the crystal to protect predetermined portions thereof from being etched, and then anisotropically etching with a mixture of sulfuric acid and phosphoric acid.

17 Claims, 12 Drawing Figures

FIG. 3B
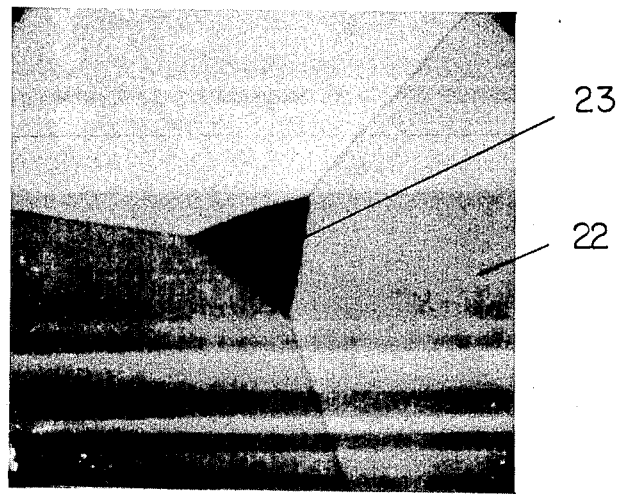
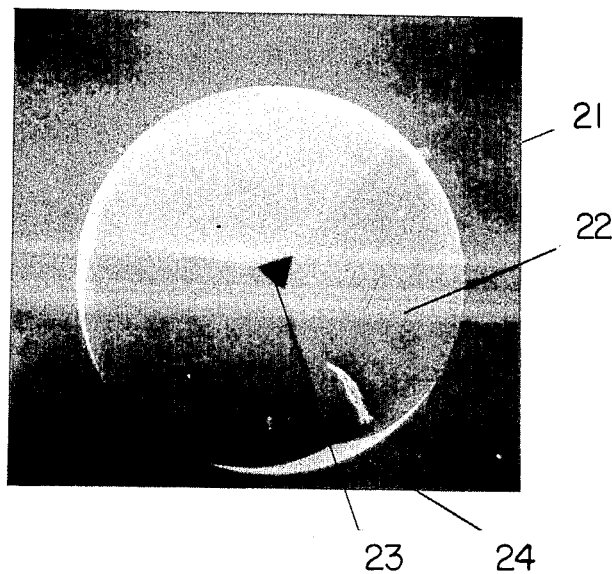
FIG. 3C

PROCESS FOR ETCHING HOLES

FIELD OF THE INVENTION

The present invention is concerned with etching apertures having well defined crystallographic geometries in single crystals and particularly in such materials as aluminum oxides including its sapphire form, spinels such as magnesium aluminum spinel and garnets such as yttrium aluminum garnet, and yttrium iron garnet.

BACKGROUND OF THE INVENTION

Substrates of hard and relatively passive materials such as sapphire, magnesium aluminum spinel, yttrium aluminum garnet (YAG), and yttrium iron garnet (YIG) with at least one aperture therein having well defined crystallographic geometry are of interest in view of their applicability as fluid spray nozzles for magnetic and electrostatic jet printing applications, and other gas or liquid metering and filtering systems requiring calibrated single or multiple orifices. Likewise, such substrates having a pattern of a plurality of apertures may be useful as substrates for wiring and packaging integrated circuits and other solid state components, or as a filter or guide for electromagnetic radiation.

In ink jet printing applications, a jet of ink is forced through a vibrating nozzle causing the jet of ink to break up into droplets of substantially equal size. The printing is affected by controlling the flight of the droplets to a target such as paper. Important characteristics for ink jet printing applications are the size of respective nozzles, spacial distribution of the nozzles in an array, and the means for vibrating the respective nozzles. Such factors affect velocity uniformity of fluid emitted from the respective nozzles, directionality of the respective droplets, and break off distance of the individual droplets, that is, the distance between the exit of the nozzle and the position of the first droplet.

Accordingly, it is important that the methods for providing apertures in such substrates be capable of accurately controlling and reproducing the size and shape of the apertures. It is important that the process be capable of providing small apertures whereby the individual size thereof can be readily controlled. When it is desired to prepare an array of a plurality of apertures, it is important that the process be capable of providing uniform size and capable of providing the desired spacial distribution of the array of apertures. Accordingly, one convenient way to achieve the desired control in providing apertures in such substrates as sapphire, magnesium aluminum spinel, yttrium aluminum garnets, and yttrium iron garnets is by use of a chemical etchant which reliably, repeatedly, and uniformly provides apertures of a defined geometric crystallography under defined conditions in substrates having certain orientation.

However, it is quite difficult to find such etchants in view of the many competing characteristics which an etchant must possess to provide the desired substrate with a well defined crystallographic geometry as required by the present invention. For instance, the suitable etchant must be capable of uniformly attacking the top surface of the substrate being treated regardless of local variations in the composition or prior surface conditions so that material in the top surface is nonpreferentially removed. If the material were preferentially removed when applied to the top surface, a selective etching process would take place whereby the etchant might preferentially attack material, for example, in cracks and fissures.

Also, in order to provide the types of apertures required by the present invention, the etchant must attack the sidewalls of the aperture at a rate different than it attacks the surface portion as it etches its way down through the material. In other words, the etchant must be anisotropic with respect to the etch rate of the surface as compared to that of the sidewalls. Moreover, problems that may exist in selecting an etchant include the fact that a substance may be suitable for removing surface material smoothly as in etch polishing procedures but on the sidewalls, due to the different orientation, etches nonuniformly causing rough sidewalls.

The present invention provides a process for etching apertures in such difficult to etch materials as aluminum oxide (e.g., sapphire), magnesium aluminum spinel, yttrium aluminum garnet, and yttrium iron garnet whereby the apertures obtained are of a well defined crystallographic geometry. Moreover, the process of the present invention is readily carried out and does not require the extreme elevated temperatures and times required by previously suggested etchants for sapphire materials.

SUMMARY OF THE INVENTION

The present invention is related to a method for etching at least one aperture or hole having a well defined crystallographic geometry in a single crystal of a material such as aluminum oxide, spinels such as magnesium aluminum spinel, and garnets such as yttrium aluminum garnet, and yttrium iron garnet. The process includes providing a substrate of the single crystal to be etched, followed by providing a masking material on the substrate to protect predetermined portions of the substrate from being etched. The masking material must be resistant to etching or attack by mixtures of sulfuric acid and phosphoric acid at temperatures of up to about 325° C. In addition, the masking material must be adherent to the substrate being etched.

The substrate is then contacted with a mixture of sulfuric acid and phosphoric acid for a time sufficient to anisotropically etch through predetermined portions of the substrate not protected by the masking material to provide at least one aperture. The mixture employed contains a range varying from a ratio of nine parts sulfuric acid to one part phosphoric acid to a ratio of one part sulfuric acid to nine parts phosphoric acid by volume. The mixture is maintained at a temperature between about 200° and 325° C during the contacting.

The particular crystallographic geometry obtained will depend upon the orientation of the surface and the orientations of the sidewalls and, to some extent, upon the temperatures of the etching composition. For instance, as will be described in detail hereinafter, holes formed in the basal plane surfaces of sapphire having orientation (0001) are three sided which converge to a point at the bottom resulting in a substantially triangular hole. On the other hand, etching magnesium aluminum spinel having orientation (100) or yttrium aluminum garnet having orientation (100) or yttrium iron garnet having orientation (100) results in four sided pyramids which taper or converge to a square hole at the bottom similar to the type of geometric crystallography shown for the silicon substrate described in U.S. Pat. No. 3,921,916 to Bassous.

That the substrate to which the present invention is directed could be etched to provide such well defined crystallographic geometries employing the phosphoric acid-sulfuric acid etchants was not predictable from the prior art. The fact that mixtures of sulfuric and phosphoric acids are suitable for polishing sapphire and magnesium aluminum spinel surfaces (see U.S. Pat. No. 3,964,942 to Berkenblit et al, and Reisman et al, "The Chemical Polishing of Sapphire and MgAl Spinel", Journal Electrochemical Society Solid State Science, Volume 118, pages 1653-57 (1971) is not sufficient to be able to predict that the same acid mixtures will possess all of the necessary characteristics for forming holes having well defined crystallographic geometries.

In particular, the etch rates when a substrate is masked can differ and does differ significantly as compared to a nonselective etch polishing wherein the entire surface is exposed to the etchant. Moreover, there is no way to predict how the etchant will affect the sidewalls of the hole as it progresses down through the surface of the material being etched. Of course, the important relationship between the relative selectivity of the etching rates between the top surface and the sidewalls necessary to provide the tapering or converging type of geometry as achieved by the present invention cannot be predicted from mere disclosure of polishing.

Although the etchant is known to be nonselective with respect to the particular top surfaces of the sapphire or magnesium aluminum spinel, there is no suggestion that such would likewise be nonselective with respect to the orientations present on the sidewalls.

The ability to etch or dissolve such materials to which the present invention is directed is a very complex and empirical art. Along these lines, the article entitled "Crystal Growth", Volume 28 (1975), pages 157-61, "The Dissolution Forms of Single Crystal Spheres V Dissolution of $\alpha$-Al$_2$O$_3$", Seismayer et al is believed relevant.

The unpredictability of the action of a mixture of phosphoric and sulfuric acid being a suitable etchant is demonstrated by the fact that such mixture is suitable as a selective etchant for gadolinium gallium garnets as disclosed by O'Kane et al in Journal Electrochemical Society, "Solid State Science and Technology", Volume 120, No. 9, pages 1272-74, Crystal Growth and Characterization of Gadolinium Gallium Garnet. A nonselective type etch for the top surface is essential in providing the types of holes required by the present invention.

Other uses of mixtures of phosphoric acid and sulfuric acid which do not suggest their suitability for the type of process employed in the present invention can be found in U.S. Pat. Nos. 3,194,704, 3,260,660, and 3,715,249.

BRIEF DESCRIPTION OF DRAWINGS

FIGS. 3A-3C are magnified photographs by scanning electron microscope of a sapphire wafer having orientation (0001) treated according to the present invention.

DESCRIPTION OF PREFERRED EMBODIMENTS

Figure 1A:
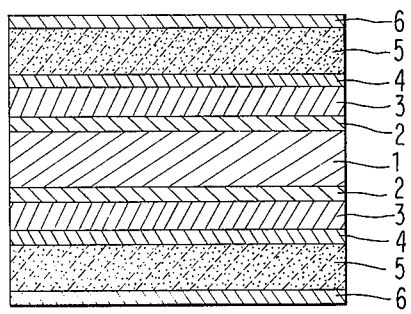
FIGS. 1A-1D represent sequential cross-sectional views of a substrate processed by a process of the present invention.
Figure 1B:
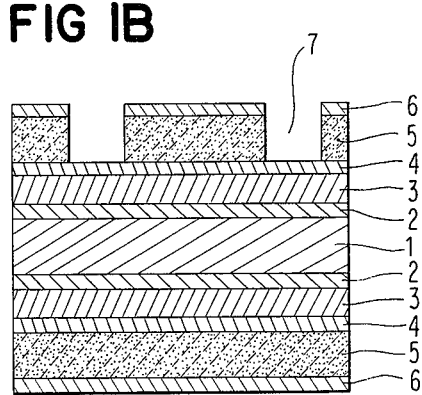
Figure 1C:
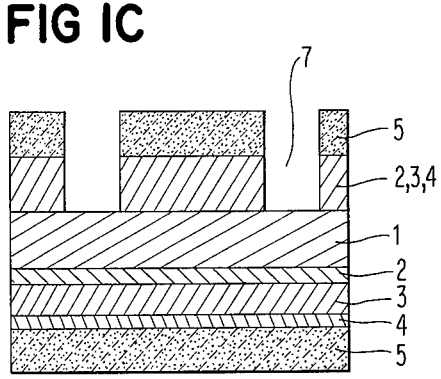
Figure 1D:
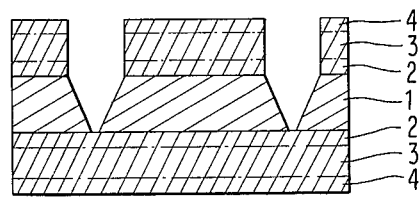

The single crystals to which the present invention is particularly suitable include those aluminum oxides having one of the following orientations (0001), (11$\bar{2}$3), (1$\bar{1}$00), (11$\bar{2}$4), (11$\bar{2}$0), and (01$\bar{1}$2), and particularly the sapphire form of aluminum oxide; and substrates having orientations (100) and (110) and particularly magnesium aluminum spinel and garnets such as yttrium aluminum garnet and yttrium iron garnet. The term "garnet" as used herein refers to crystals of a rare earth, a group III metal or iron, and oxygen.

The present invention is preferably carried out by treating the basal plane of sapphire having orientation (0001), yttrium aluminum garnet of orientation (100), magnesium aluminum spinel of orientation (100), or yttrium iron garnet of orientation (100). The basal plane is that plane perpendicular to the C axis. The most preferred substrate employed according to the present invention is sapphire particularly when the final article to be employed is an ink nozzle. Sapphire has previously been suggested for such purposes (e.g., see U.S. Pat. No. 3,823,408 to Gordon, III).

Suitable substrates to be employed in the present invention are readily available. For instance, wafers of highly mechanically polished sapphire ($\alpha$-Al$_2$O$_3$) and magnesium aluminum spinel (MgO.Al$_2$O$_3$) are available from commercial sources.

For a discussion of a process sequence of the present invention, reference is made to FIGS. 1A-1D.

The process of the present invention is carried out by providing a coating of a masking material on the substrate 1. The masking material must be adherent to the substrate and must be capable of resisting etching by the mixture of phosphoric and sulfuric acid at elevated temperatures of up to about 325° C. It has been found, according to the present invention, that a good masking material and particularly for an aluminum oxide substrate such as sapphire, is obtained by first coating the substrate with a chromium layer 2. The coated substrate is then further coated with a metal of the platinum family and preferably with platinum or rhodium and most preferably with platinum.

The presence of the chromium layer 2 is important since it enhances the adhesion or adherence between the substrate and the layer 3 of the platinum family. As will be discussed hereinbelow, the coated substrate is heated to achieve a reaction between the metal of the platinum family and chromium thereby forming a layer containing platinum-type chromium compounds, the predominant compound, when platinum is employed, being CrPt$_3$. The presence of the chromium also improves the etchability of the masking layer. In particular, members of the platinum family and particularly platinum cannot be etched too readily.

Both the chromium and platinum-type layers (2 and 3) are preferably applied to the substrate by sputtering techniques at elevated temperatures usually between about 100° and about 300° C and preferably about 200° C. The chromium layer 2 is preferably about 100 to about 500 angstroms thick and the platinum-type layer 3 is preferably from about 2,000 to about 5,000 angstroms thick. The coating is preferably done by sputtering techniques since such techniques ensure coating of the edges of the substrate as well. This is essential to prevent etching in undesired locations of the substrate.

Next, a second chromium layer 4 is applied. This layer 4 is preferably applied by sputtering techniques at temperatures between about 100° to 300° C and preferably about 200° C. The thickness of the chromium layer 4 is normally between about 100 and about 500 angstroms.

Next, a layer 5 of silicon dioxide is applied to the coated substrate. The silicon dioxide 5 is also preferably applied by sputtering coating techniques. The silicon dioxide layer 5 is between about 0.5 to about 2 microns and preferably about 1 to 2 microns. This layer 5 is employed as a masking layer for defining the predetermined hole in the platinum-type containing layer. Normal photoresist materials cannot be employed to define the platinum-type layer since such materials normally do not withstand the etching compositions needed to etch the platinum-type containing layer and particularly do not withstand aqua regia. Accordingly, the requirement for this particular layer 5 is that it is capable of withstanding the etching materials needed to etch the platinum-type containing layer and particularly capable of withstanding action by aqua regia and must be adherent and nonreactive with the platinum-type layer beneath it. For instance, an attempt with silicon nitride as this layer 5 was unsuccessful since such reacted with the platinum-type layer and therefore was not suitable for the purposes of the present invention.

The layer 4 of the chromium is important since it enhances the bonding between the platinum-type layer 3 and the silicon oxide layer 5.

Next, the coated structure is heated in an oxygen atmosphere and preferably in pure oxygen to form the metallic compounds of the member of the platinum family and chromium in order to improve the adhesion to the substrate. The heating is generally between about 700° and 1,100° C for between about 15 minutes to about 2 hours. The temperature and time should be sufficient to allow for complete reaction between the member of the platinum family and chromium but not excessive so as to avoid undue grain growth of the platinum-type chromium layer. Generally it is found that between about 15 minutes and about 2 hours at temperatures between about 700° and about 1,100° C are sufficient for this purpose. The silicon oxide layer helps to provide the proper rate of oxygen diffusion through the layers to contact the member of the platinum family and chromium for improving the bonding of the reacted compound masking layer to the substrate. It has been found that this heat treatment in pure oxygen with a member of the platinum family alone such as platinum without the chromium did not provide sufficient adhesion to the substrate.

Desired openings in the silicon oxide layer are now achieved by employing standard photoresist techniques. For instance, a layer 6 of a positive photoresist is applied to both sides of the substrate such as a photoresist available under the tradename AZ-1350. Next, a mask is applied on top of the photoresist so as to expose only those portions of the photoresist to ultraviolet light or electron beam radiation which is to be removed to represent the holes or openings in the silicon dioxide layer below.

After exposure to the radiation, those portions of the photoresist exposed thereto will be removed upon application of the etching material for the silicon oxide. One particular etchant employed is buffer HF at room temperature. This etches the $SiO_2$ in the area previously containing the exposed portions of the photoresist material but does not attack the unexposed photoresist material nor the silicon dioxide material under the photoresist and protected thereby.

Next, the entire photoresist material is removed, for instance, by dissolving in acetone. The silicon oxide layer now serves as the mask to etch corresponding holes in the platinum-type chromium layers. A preferred etchant for providing holes in the platinum-type layer is aqua regia ($1HNO_3:3HCl$). The etching is normally carried out at temperatures between about 50° and 85° C, from about ½ to about 5 minutes. The preferred temperatures are from about 50° to about 60° C.

The silicon dioxide layers 5 are now removed with buffered HF at about room temperature. The buffered HF does not affect the platinum-type metallic layers.

The platinum-type chromium layer now acts as a mask for the substrate. The exposed areas of the substrate are then etched in a mixture of the sulfuric and phosphoric acid at temperatures between about 200° and about 325° C and preferably at temperatures between about 250° and 300° C. The most preferred temperature for sapphire is about 285° C. The acid mixture can contain from about nine parts sulfuric acid to one part phosphoric acid to one part sulfuric acid to nine parts phosphoric acid by volume.

The time required for this step in the process depends upon the specific acid composition employed, the temperature of the treatment and upon the thickness of the substrate. Normally the rate of etching of the substrate is about 12 microns per hour depending upon such factors as the depth of the hole being etched, and the size of the hole. The etch rates through the masked substrate will always be at least equal to and in most cases greater than the etch rate on unmasked blanks of the substrate. This is due to what is known as flux enhancement phenomenon since as the hole gets smaller as it converges, more etching material is available per hole area.

The shape of the openings in the mask can be varied but is preferably substantially a circular hole. Employing a circular hole tends to facilitate obtaining more readily a well defined crystallographic geometry. For instance, as shown in FIGS. 2A to 2D, starting with a circular hole for a sapphire substrate resulted in a triangular hole at the bottom of substantially straight and equal size. As used herein terms such as "substantially triangular" and "substantially square" include not only shapes wherein the sides are straight lines but also include shapes wherein the sides are arced to some degree as shown in FIGS. 2B and 2C.

Figure 2A:
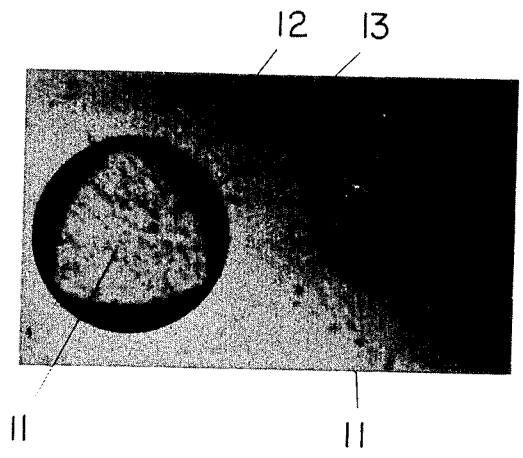
FIGS. 2A-2D are magnified sequential photographs by interference contrast of a sapphire wafer having orientation (0001) treated according to the present invention.
Figure 2B:
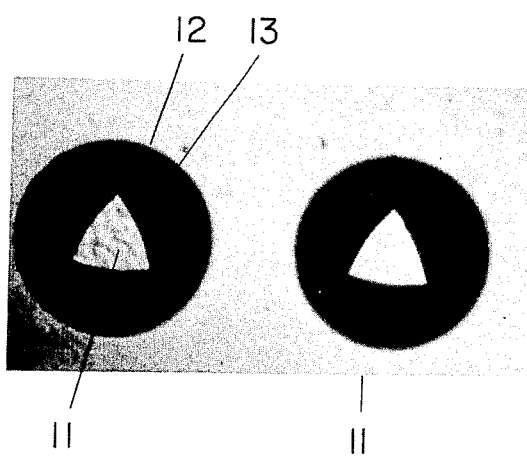
Figure 2C:
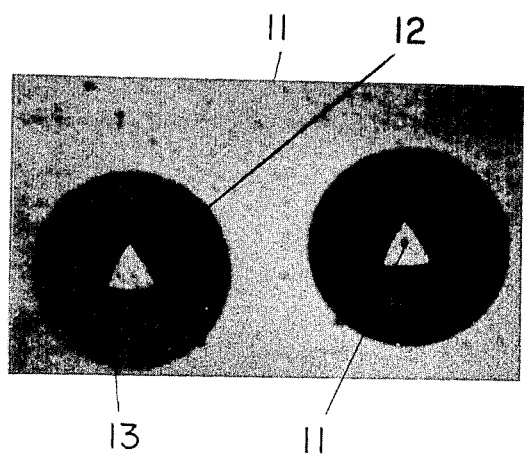
Figure 2D:
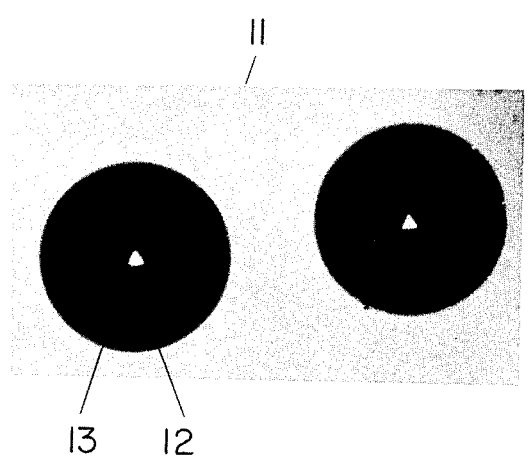

FIGS. 2A-2D are magnified sequential photographs of a (0001) sapphire wafer 11 treated in accordance with the present invention. The photographs are by interference contrast. The wafer is about 10 mils thick. The diameter of the circular mask or opening is about 32 mils. FIGS. 2A-2C are photographs wherein the holes 13 have not yet been etched through the wafer. In FIG. 2D, the holes are formed through the wafer. Each side of the triangular hole 13 in FIG. 2D is about 1.5 mils.

Figure 3A:
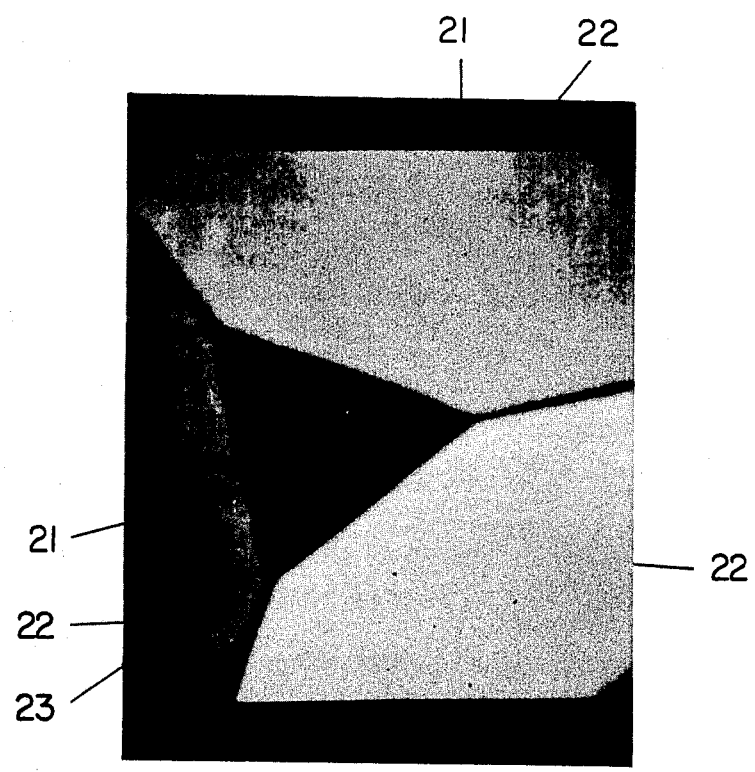

FIGS. 3A-3C are magnified photographs by scanning electron microscope of a (0001) sapphire wafer 21 treated according to the process of the present invention. FIGS. 3A and 3B are magnified about 1,440 times.

FIG. 3A is a photograph wherein the holes 23 have not yet been etched through the entire wafer. In FIG. 3B, the holes are formed through the wafer 21. FIG. 3C corresponds to FIG. 3B except that it is of a lesser magnification thereby permitting a somewhat improved view of the original circular hole in the mask 24. In FIGS. 3A–3C, 22 represents the converging walls of the hole.

Figure 4:
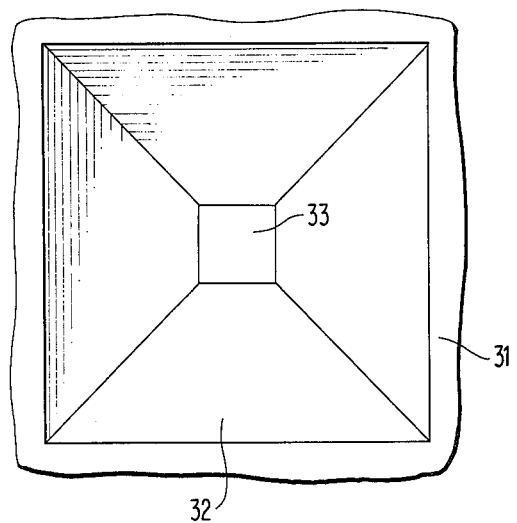
FIG. 4 represents a top view of a substrate having orientation (100) processed in accordance with the present invention.

FIG. 4 represents top perspective view of a substrate 31 of (100) orientation processed in accordance with the present invention. The apertures are pyramid-like having 4 sides 32 resulting in a square hole 33 at the bottom of the substrate.

The following examples are provided to further illustrate the present invention.

EXAMPLE 1

A metallic chromium layer of about 300 angstroms is applied to one side of a (0001) sapphire substrate by sputtering at a temperature of about 200° C. Next, a layer of about 5,000 angstroms of platinum is applied to the coated side of the substrate by sputtering at a temperature of 200° C. This is followed by a second layer of chromium of about 300 angstroms on the coated side of the substrate being applied by sputtering at about 200° C. Next, a silicon oxide layer of about 5,000 angstroms is sputtered onto the coated side of the substrate at a temperature of about 200° C. The above sequence of layers is repeated on the other side of the substrate or provide the coated structure as illustrated in FIG. 1A.

The coated substrate is then heated for about 1 hour at 1050° C in pure oxygen. Next, a positive photoresist coating such as AZ-1350 is applied to all surfaces of the coated substrate. A mask having substantially circular openings is then applied after which the unmasked portions of the photoresist are exposed to ultraviolet light. Corresponding circular openings are obtained in the silicon dioxide layer by etching with buffered HF at about room temperature. The unexposed photoresist material is now removed by dissolution in acetone. The silicon oxide layer now serves as a mask to etch holes in the platinum-containing layer. The openings in the platinum layer are etched by employing aqua regia ($1NHO_3:3HCl$) at about 60° C for about 3 minutes.

After opening the holes in the platinum-type layer, the exposed sapphire substrate is etched in a mixture of one part by volume sulfuric acid to one part by volume phosphoric acid at a temperature of about 285° C. FIGS. 2A–2D are photographs of the progression of the hole at it is etched in the sapphire substrate. As noted, the holes formed on the basal plane of the sapphire are three-sided, converging to a point at the bottom. It was observed that the etching rate is relatively rapid until the three converging planes meet, and then the rate becomes much slower since it is determined by the newly exposed planes. These new, slow etching planes form an angle of about 32.4° with the starting surface. By selecting the thickness of the sapphire wafer, the diameter of the hole in the platinum mask, the particular dimensions of the triangular hole can be readily determined. For instance, a 4 mil thick sapphire wafer would require about a 13 mil diameter hole to form a triangular opening of one mil on an edge.

EXAMPLE 2

Example 1 is repeated except that the substrate employed is a yttrium aluminum garnet having orientation (100). The holes achieved are four sided pyramids resulting in a square hole at the bottom as illustrated in FIG. 4. It is noted however that some undercutting of the circular mask did occur. Moremover, etching the (100) surface of magnesium aluminum spinel and the (100) surface of yttrium iron garnet would result in a geometric structure substantially the same as the structure achieved with the yttrium aluminum garnet. The adhesion between the platinum chromium layer and magnesium aluminum spinel was not quite as good as the adhesion with the sapphire surface.

The sulfuric acid utilized in the practice of the present invention is concentrated sulfuric acid which is a concentrated aqueous solution containing about 95–98 weight percent $H_2SO_4$. The phosphoric acid utilized is concentrated phosphoric acid which is concentrated aqueous solution containing 85 weight percent $H_3PO_4$.

The orientations indicated hereinabove are well known to those skilled in the art of crystallography. The nomenclature utilized [(100), (0001)] describes the sets of planes within a crystallatice which form crystal faces and these are characterized as Miller Indices. For a more detailed explanation of Miller Indices. see Van Nostrand's Scientific Encyclopedia, Third Edition, under "crystallography" on page 456. This subject is also discussed in still more detail in the "Textbook of Physical Chemistry" by S. Glasstone, Second Edition, pages 340–46, D. Van Nostrand Company, Inc.

What is claimed is:

1. A method for etching at least one aperture having well defined crystallographic geometry in single crystal of a material selected from the group consisting of aluminum oxide, spinel, yttrium aluminum garnet and yttrium iron garnet which comprises:

(A) providing a substrate of said single crystal;
    (B) providing a masking material on all sides of said substrate and providing at least one aperture in said masking material to thereby protect predetermined portions of the substrate from being etched, said masking material being resistant to etching at temperatures of up to about 325° C with mixtures of $H_2SO_4$ and $H_3PO_4$; and being adherent to the said substrate;
    (C) contacting said substrate with a mixture of sulfuric acid and phosphoric acid in a range of mixtures of nine parts sulfuric acid to one part phosphoric acid to one part sulfuric acid to nine parts phosphoric acid by volume, for a time sufficient to anisotropically etch through said at least one aperture to provide said substrate with at least one aperture having well defined crystallographic geometry, said mixture being at a temperature of about 200° to about 325° C during said contacting.

2. The method of claim 1 wherein said material is selected from the group of sapphire substrates having one of the orientations (0001), (11$\bar{2}$3), (1$\bar{1}$00), (11$\bar{2}$4), (11$\bar{2}$0), and (01$\bar{1}$2); magnesium aluminum spinel substrates having one of the orientations (100) and (110); yttrium aluminum garnet substrate having one of the orientations (100) and (110); and yttrium iron garnet substrate of one of the orientations (100) and (110).

3. The method of claim 1 wherein said single crystal substrate is of (0001) sapphire and wherein the etching is directed towards the basal plane thereof.

4. The method of claim 1 wherein the step of providing a masking material includes depositing a metal of the platinum group on said substrate.

5. The method of claim 4 wherein said single crystal substrate is of (0001) sapphire and wherein the etching is directed towards the basal plane thereof.

6. The method of claim 5 wherein said at least one aperture is three-sided and converging at the bottom to a substantially triangular hole having sides substantially straight and of equal size.

7. The method of claim 5 wherein the mixture of phosphoric and sulfuric acid is a 1 to 1 ratio and the temperature is 285° C.

8. The method of claim 4 wherein said metal is platinum.

9. The method of claim 1 which includes sequentially depositing chromium on the substrate followed by a metal of the platinum family followed by a second chromium layer and then silicon oxide.

10. The method of claim 9 wherein the substrate, after the coating, is heated in an oxygen atmosphere at a temperature of 700° to about 1100° C for a time sufficient for reaction of the chromium and a metal of the platinum family layers and to allow slow diffusion of oxygen to improve the bonding of the reacted metal layer to the substrate but not excessive to avoid grain growth of the subsequently formed layer of the metal of the platinum family and chromium.

11. The method of claim 10 wherein said heating is conducted from about 15 minutes to about 2 hours.

12. The method of claim 10 wherein said metal is platinum.

13. The method of claim 10 wherein said materials are deposited by sputtering.

14. The method of claim 10 wherein the chromium layers are about 100 to about 500 angstroms thick, the metal of the platinum family layer is about 2000 to about 5000 angstroms thick, and the silicon dioxide layers are about 0.5 to about 2 microns thick.

15. The method of claim 1 wherein the substrate is sapphire and the mixture of phosphoric and sulfuric acid is a 1 to 1 ratio and the temperature is 285° C.

16. The method of claim 1 wherein the shape of the openings in said mask is substantially a circular hole.

17. The method of claim 1 wherein said single crystal substrate is of (100) yttrium aluminum garnet, or (100) magnesium aluminum spinel or (100) yttrium iron garnet and said at least one aperture is a four-sided pyramid resulting in a square hole at the bottom.

* * * * *